United States Patent [19]

Whiteley

[11] 4,021,692
[45] May 3, 1977

[54] PERIPHERAL COMMUTATOR FOR DISCOIDAL ARMATURE

[75] Inventor: Eric Whiteley, Peterborough, Canada

[73] Assignee: Canadian General Electric Company Limited, Toronto, Canada

[22] Filed: Mar. 6, 1975

[21] Appl. No.: 556,119

[30] Foreign Application Priority Data

Mar. 13, 1974 Canada .................... 194865

[52] U.S. Cl. .................... 310/237; 310/268
[51] Int. Cl.² .................... H02K 1/22
[58] Field of Search .......... 310/233, 236, 237, 266, 310/268, 202–208, 43, 45; 29/597, 598; 178/52, 53

[56] References Cited

UNITED STATES PATENTS

| | | | |
|---|---|---|---|
| 1,241,559 | 10/1917 | Scheibe | 310/237 |
| 2,818,518 | 12/1957 | Phaneuf | 310/237 |
| 3,599,325 | 8/1971 | Burr | 310/237 |
| 3,869,788 | 3/1975 | Lazaroiv | 310/236 |
| 3,906,622 | 9/1975 | Sakano | 310/237 |

FOREIGN PATENTS OR APPLICATIONS

| | | | |
|---|---|---|---|
| 771,292 | 11/1967 | Canada | 310/268 |
| 401,292 | 11/1933 | United Kingdom | 310/237 |
| 121,320 | 12/1918 | United Kingdom | 310/237 |

*Primary Examiner*—R. Skudy
*Attorney, Agent, or Firm*—R. A. Eckersley

[57] ABSTRACT

A disc-shaped armature consists essentially of a flat, circular array of overlapping coils bonded together by means of a resinous material to provide a rigid discoidal structure having a disc portion containing the coil sides and inner and outer concentric ring portions containing the coil end-heads. According to the invention the discoidal structure is provided with at least one commutator on the outer ring portion of the structure.

12 Claims, 11 Drawing Figures

VIEW IN DIRECTION OF ARROW "X" (FIG. 10)

PERIPHERAL COMMUTATOR FOR DISCOIDAL ARMATURE

This invention relates to discoidal armatures for dynamoelectric machines, and in particular to peripheral commutators for these armatures.

A machine of the type to which this invention is applicable has a disc-shaped armature consisting essentially of a flat, circular array of overlapping coils bonded together by means of a resinous material to provide a rigid discoidal structure having a disc portion containing the coil sides and inner and outer concentric ring portions containing the coil end-heads. According to the invention the discoidal structure is provided with at least one commutator on the outer ring portion of the structure, i.e., one or more peripheral commutators. This type of commutator will also be referred to hereinafter as a "peripheral commutator."

In the case of a discoidal armature, a commutator on the outer ring portion of the structure is much larger in diameter than a commutator located at the hub of the armature. The larger diameter commutator offers certain advantages, some of which are as follows:

(1) It makes possible the use of a very large number of segments in the commutator. A large number of commutator segments can be utilized in a machine design in two ways. First, it enables the use of a higher terminal voltage than otherwise practical. Second, it makes possible very low "volts per segment". If the "volts per segment" are low enough, it is possible to design a motor or generator without commutating poles of compensating windings, particularly in permanent magnet fields; and (2) a second advantage of the peripheral type commutator is the very long electrical creepage surface from the exposed commutator segments to the nearest ground potential metal surface, which in this case is the metal hub of the discoidal structure. Since the entire armature winding is embedded in the resin, the only exposed conductors are at the commutator. Another significant advantage of placing the commutator on the outer ring portion of the armature is that it can now be readily provided in multiplex form, i.e., the armature can be provided with a number of separate commutators.

The multiplex commutator permits either voltage per segment or current per segment, or a combination thereof, to be lower than would be possible with a simplex commutator. For example, by using two commutators, one on each side of the winding structure, twice as many segments become available for commutating the winding. This arrangement also places the segment in a convenient location for connection to the winding. Yet another, and perhaps a somewhat lesser advantage of a peripheral type commutator is the location of the brush rigging; it is now quite accessible for servicing because it is located on the periphery of the machine.

It will be appreciated that large diameter peripheral commutators mean lower armature speeds than with the smaller diameter hub commutators. However, many practical ratings are for large horsepowers at relatively low RPM, in which cases the peripheral commutator is quite suitable.

A better understanding of the invention may be had from the following description taken with the accompanying drawings, in which FIG. 1 is a view in elevation of a dynamoelectric machine constructed according to the invention and showing the main components in cross section;

Figure 1:
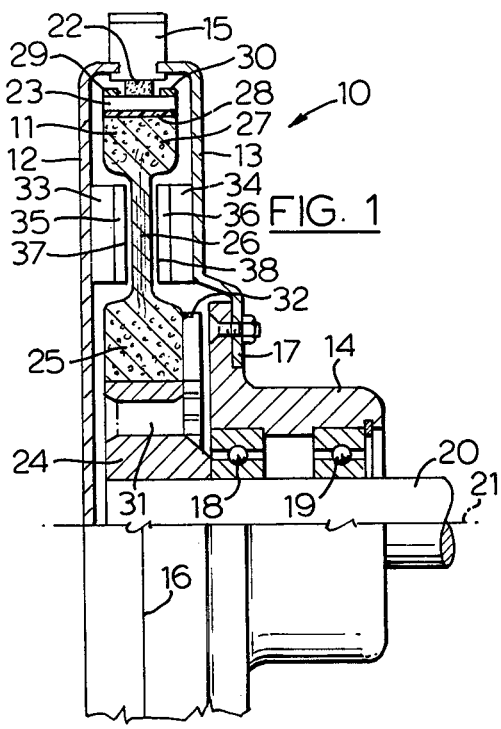

The machine 10 illustrated in FIG. 1 is a disc-type permanent magnet, DC machine suitable for use either as a motor or as a generator. However, for purposes of the description to follow, it will be referred to hereinafter as a motor. Machine 10 consists essentially of an armature 11 supported for rotation in a stator having housing members 12 and 13, an armature supporting structure 14, and brush assemblies 15.

Housing members 12 and 13 are dish-shaped members made of a magnetic material such as mild steel and serve as the yoke of the magnetic field circuit and provide a substantial portion of the enclosure of the machine. They have their outer edges 16 formed with means for maintaining then in alignment, and are secured together at these edges. Member 13 has an open center defined by the inner edge portion 17, and has the bearing retaining member 14 secured to this inner edge portion. The armature supporting structure 14 includes a bearing housing and the ball bearings 18 and 19 retained inside the housing and supporting the shaft 20 of armature 11 for rotation on its axis 21. Each one of the brush assemblies 15 consists of an insulating brush holder supported by housing members 12 and 13 and carrying a conductive brush 22 that bears against a commutator 23 on the periphery of armature 11.

Armature 11 resembles a disc wheel. It consists of the following annular portions disposed concentrically about axis 21; shaft 20; a hub 24 secured to the shaft; an inner ring portion 25 secured to the hub; a disc portion 26 integral with the inner ring portion; an outer ring portion 27 integral with the disc portion; a band of insulation 28 on the periphery of the outer ring portion; a commutator 23 surrounding the insulating band; and two tension bands 29 and 30 surrounding the commutator for holding its segments in place. More will be said about the commutator later. The integral structure of portions 25, 26 and 27 is the armature winding and a resinous material bonding the winding conductors together in a strong and rigid discoidal structure wherein the electrical conductors reinforce the resinous mass mechanically. In forming the armature winding, the coils are laid in a flat circular array with the corresponding sides thereof overlapping the other corresponding sides, and with the outer and inner end-heads respectively nested together. The coils are identical, or as nearly identical as it is possible to make them, and their shape is such that they minimize copper and yet fit well together in a compact winding. Once the coils are in place in the winding, their sides are pressed together to a specified coil side thickness and the entire winding is then encapsulated in a resinous material, e.g., an epoxy resin that will flow between the conductors. The resin may be reinforced with glass fibers in selected regions to improve the winding structure of electrical conductors bonded together by means of a resinous material. This structure is rigid and strong enough to be self supporting. The resin bonded winding structure is in the configuration of an annular disc portion 26 located between enlarged inner and outer ring portions 25 and 27 respectively, and the three portions are coaxial. Disc portion 26 is relatively thin and contains the sides of the coils, the sides being radial and at a span of approximately one pole pitch. The coil end-heads on the diverging ends of the sides are located in the outer ring portion 27 and the heads on the converging ends of the sides are located in the inner ring portion 25. Winding structures of this nature are described in more detail in U.S. application, Ser. No. 534,058 filed Dec. 18, 1974, Eric Whiteley. In the aforementioned armature winding, the coils may be connected to the commutator segments in any one of a number of well known circuits.

The hub 24 serves as a means for supporting the discoidal structure on the shaft for rotations in a plane normal to axis 21 and also as a fan for circulating a cooling medium counterclockwise around the discoidal structure, the hub having a number of axial fluid flow passages 31 and a number of radially disposed blades 32 for impelling the fluid outwardly. The hub may be bonded to the winding structure by means of the resin that bonds the coils together. The cooling medium circulated around the armature causes heat to be transferred from the armature to the ambient via the housing.

One pair of a number of pole pairs is shown in FIG. 1 as consisting of magnetic spacing members 33 and 34 attached to housing members 12 and 13 respectively and permanent magnets 35 and 36 attached to members 33 and 34 respectively, components 33 and 35 being regarded as one pole structure and components 34 and 36 as the other pole structure of the pair. Each pole structure 33, 35 projects from housing member 12 and terminates in a flat pole face 37 on the magnet lying in a plane normal to axis 21 and spaced somewhat from the flat surface on disc portion 26 of the armature. Each pole structure 34, 36 projects from housing member 13 and terminates in a flat pole face 38 on the magnet lying in a plane normal to axis 21 and spaced somewhat from the other flat surface on disc portion 26 of the armature. This allows the armature freedom of rotation between the various pairs of poles. Spacers 33 and 34 may be pieces of a mild steel welded to the housing members and the magnets may be bonded to the spacers by means of an epoxy or a methyl-2-cyanoacrylate (Eastman 910) adhesive. In the interest of manufacturing economy, magnets 35 and 36 will usually be flat on both sides and of uniform thickness, in which case the spacers will be shaped to position the magnets for the required distance between their pole faces 37, 38. Pole faces 37, 38 are of opposite magnetic polarity so that permanent magnets 35, 36 aid in providing magnetic flux in the gap between their faces, i.e., the gap containing the armature disc. Since spacers 33, 34, and housing members 12, 13 are made of magnetic materials they provide return flux paths.

In FIG. 1, the disc portion 26 of the armature is shown uniform in thickness. This is not always desirable; for example, in some machines it may taper from the inner ring portion 26 to the outer ring portion 27, i.e., the disc portion is thicker at 26 then it is at 27. Such a structure is illustrated and described in U.S. application, Ser. No. 534,009 filed Dec. 18, 1974, Eric Whiteley. It is possible, and indeed sometimes desirable, to use only one of the permanent magnets 35 or 36 in a pole structure, in which case the spacer will be thick enough to fill the space left by the magnet that is removed. In some designs, it may be desirable to eliminate spacers 33 and 34 and deform the walls of housing members 12 and 13 inwardly so that the magnets can be mounted directly on the deformations, or even mount the magnets on an undeformed wall. Although it is preferable to have the magnets define the pole faces, this is not always necessary; the magnets may be located under pole shoes. In some pole structures the magnet may be mounted on one wall and the other wall made, pole face. Each one of the magnets 35, 36 may be a single permanent magnet or a mosaic of unit permanent magnets as disclosed in U.S. application, Ser. No. 502,007 filed Aug. 30, 1974, Eric Whiteley, e.g., ferrite or cobalt-rare earth magnets.

The commutator shown in FIG. 1 consists of a large number of elongated segments or bars of generally trapezoidal cross section placed side-by-side parallel to axis 21 and insulated from one another. They overlay the band 28 which insulates them from the winding structure. This band may also be a tension member stressing the discoidal structure in compression, i.e., a band of a number of layers of a epoxy resin impregnated glass tape applied under tension and the resin then cured to bond the layers of tape together and to the structure. The commutator segments are bonded to band 28, e.g., by means of an epoxy resin, and two tension bands 29 and 30 are applied over the segments. These bands may be glass fibers impregnated with an epoxy resin and then applied under tension. Once the resin has been cured, these bands become very strong, pressing the segments against band 28 and thereby holding them fast against the centrifugal forces of the rotating armature.

FIG. 1 shows one of the two or more brush assemblies used in the machine. As is well known, the number needed depends on a number of factors, and in particular on the way that the coils are connected to the commutator segments. In FIG. 1, each brush assembly 15 is shown trapped in a cut-out in the two housing members 12 and 13.

Figure 2:
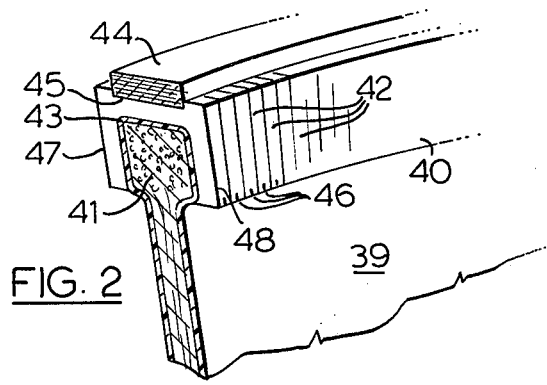
FIG. 2 is a view in perspective of a sector of a discoidal armature showing another embodiment of a peripheral commutator.

FIG. 2 shows a sector of a discoidal armature 39 having a commutator 40 on its outer ring portion 41. In this particular case, the commutator consists of an annular array of U-shaped segments 42 placed astride the ring portion 41 of the armature with the bases of the U's at the peripheral surface of the ring portion and the two legs of the U's disposed radially with respect to the axis of rotation or the armature. The segments are bonded to the armature ring portion at 43 and held securely in place by means of a band 44 around the peripheral commutator surface defined by the bases of the U's. A groove 45 may be formed in this surface to help hold the band in place. The bonding medium 43 may be a strong epoxy resin with good adherent qualities, and the band 44 may be a pre-stressed fiber-glass roving or tape impregnated with a strong epoxy or polyester resin. The banding material is applied under tension while its impregnant is in a semi-cured or uncured state, after which the resin is cured to its solid state to provide a strong prestressed band. Marks 46 are points where the coil ends may be connected to the commutator segments. Commutator 40 has two plane brush contacting surfaces 47 and 48 instead of one cylindrical surface as on the commutator 23 of FIG. 1, i.e., it has two working faces normal to the axis of rotation of the armature.

Figure 3:
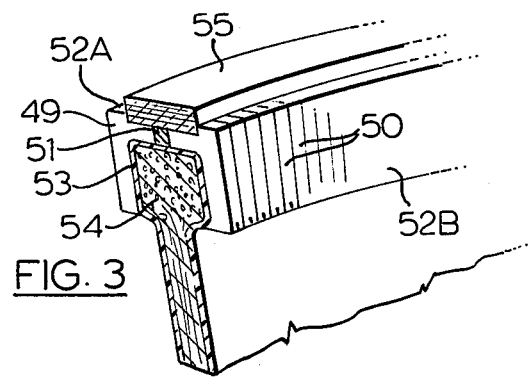
FIG. 3 is a view like that of FIG. 2 but showing a duplex rather than a simplex commutator.

The type of commutator shown in FIG. 2 lends itself to duplexing, i.e., the provision of two separate peripheral commutators. This is accomplished by dividing the U-shaped segments 42 into two L-shaped segments 49 and 50 as shown in FIG. 3 and placing a band of insulation 51 between the two rings of segments so as to define two separate commutators 52A and 52B, each of which has a plane working face normal to the axis of rotation of the armature for a set of brushes to contact. The segments of the two commutators are secured to the outer ring portion 54 of the armature by means of a resinous medium 53 which bonds them to the ring portion and a peripheral band 55 of resin impregnated fiberglass filaments applied in tension.

Figure 4:
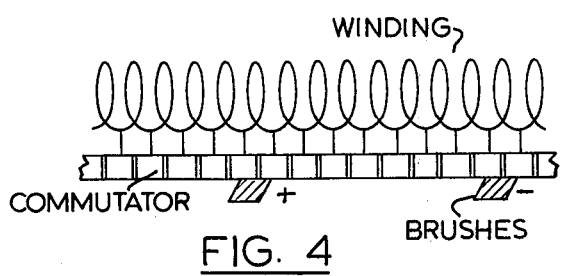
FIGS. 4, 5 and 6 are diagrams of armature windings suitable for use with the commutators of FIGS. 1 to 3.
Figure 5:
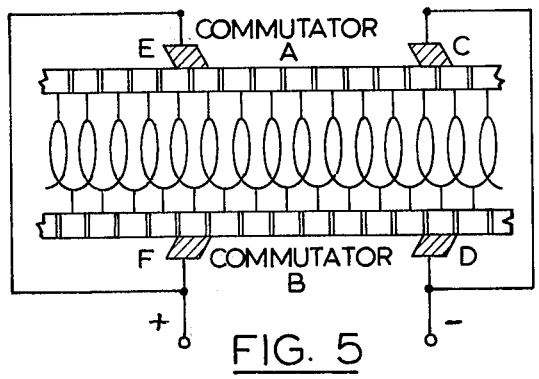
Figure 6:
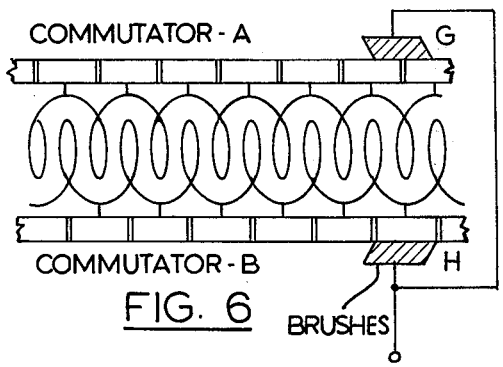

FIG. 4 shows a developed view of the disc winding and simplex commutator of FIG. 2. In FIG. 4 the winding with its commutator segments attached is mentally uncoiled and spread out in a straight line. This is shown for comparison with the duplex arrangements. FIG. 5 shows a similarly developed view of a disc winding of the simplex type with a duplex commutator. It is evident from this figure that the coils in the winding effectively commutate now as half-coils, when compared with FIG. 4. The effect of this is to be commutating at half the voltage per segment. The location of commutator segments and brushes on the two commutators relative to each other is important in this concept. What is desired is that segments in commutator A leave brushes C and E at an instant when the edges of brushes D and F are midway across segments of commutator B. This arrangement is for the lower voltage per commutator segment condition. FIG. 6 shows a developed view of a disc winding with duplex commutator and duplex winding. This is for the lower current per segment condition. Now shown in this figure are equalizing connection between equipotential points in the two windings (or plexes). Such connections are commonly used in conventional duplex wound D.C. armatures, and could be used here also.

Figure 7:
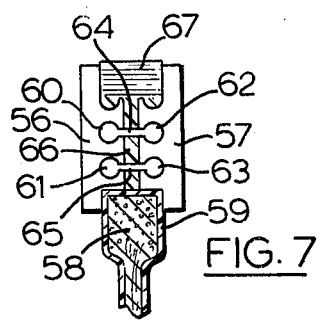
FIGS. 7 to 9 are views in section of other versions of the duplex commutator.

The duplex commutator shown in FIG. 7 has two rings of segments 56 and 57 on the outer ring portion 58 of the disc armature. A layer of insulation 59 on the ring portion insulates the segments from the armature conductors. Each segment 56 is formed with two undercut notches 60 and 61 located axially opposite like notches 62 and 63 in the segment 57 backing onto it. Each pair of back-to-back segments 56, 57 are held in place by a dumbell-shaped member 64 having its bulbous ends fitted loosely in notches 60 and 62 and another dumbell-shaped member 65 having its bulbous ends fitted loosely in notches 61 and 63. The segments are held securely in place by a resinous material 66 in the annular space between the two rows of segments and in their notches. This material envelopes the members, bonding them to the segments and segments the outer ring portion 58 of the armature. A fiberglass-resin band 67 is applied under tension around the segment assembly, pressing the segment assembly against the outer ring portion of the armature. The prestressed band and the resin bond hold the segments securely in place. Members 64 and 65 are made of an insulating material such as glass fibers bonded together with a synthetic resin.

Figure 8:
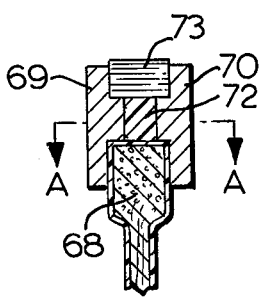
Figure 9:
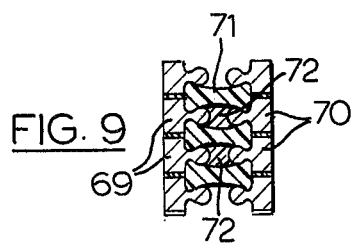

FIGS. 8 and 9 illustrate another means for interlocking the commutator segments on the outer ring portion 68 of the armature. The two rings of segments 69 and 70 are now interlocked by the dumbell members 71 as best illustrated in FIG. 9 (Section A-A) and the spaces between the segments and members filled with a resinous material 72. A fiberglass-resin band 73 applied in tension around the commutator assembly completes the means for securing the commutator to the outer ring portion of the armature.

The commutators shown in FIGS. 2, 3, 7 and 8 have their working faces, i.e., the surfaces making contact with the brushes, in plane normal to the axis of rotation. Instead of plane surfaces, the working surface of one or both commutators could take the shape of a shallow cone.

In the case of a dynamoelectric machine having a discoidal armature and a permanent magnet field structure, it is desirable that good commutation be achieved without the use of compensating or commutating windings. As is well known, uncompensated commutation is limited in terms of the power per coil unit being commutated. The multiplex commutator is intended to make it possible to build an uncompensated disc-type machine having an armature in which the number of commutating coil units is 2, 4, 6, etc., times the number which could be designed into the same size of armature with a simplex commutator. In this way much larger powers per armature can be achieved than otherwise possible.

Figure 10:
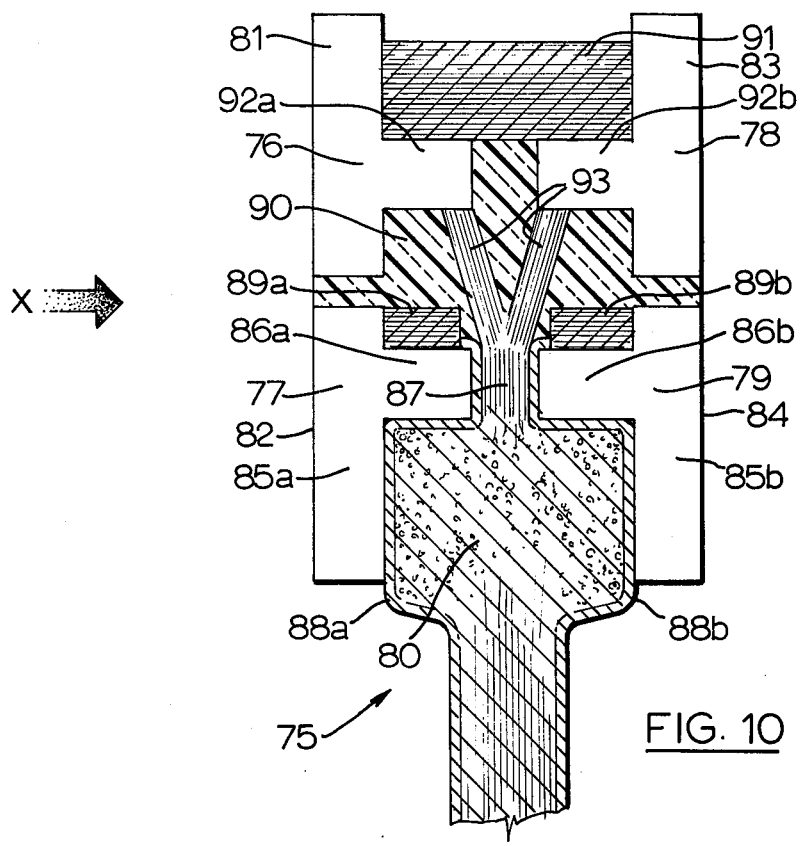
FIGS. 10 and 11 are view of a multiplex commutator.

FIG. 10 shows a section of a discoidal armature 75 having four separate commutators 76 to 79 mounted on its outer ring portion 80. In effect, there are two concentric pairs of commutators of the type shown in FIG. 3. Commutators 77 and 79 are located around the ring portion in a back-to-back relationship, and commutators 76 and 78 are located around commutators 77 and 79 respectively in a similar back-to-back relationship. All four commutators are coaxial with respect to the axis of armature rotation, and the pair 77, 79 is concentric with respect to the pair 76, 78. Commutators 76 and 77 present plane working faces 81 and 82 on one side of the armature and commutators 78 and 79 present plane working faces 83 and 84 on the other side of the armature, all of which faces are normal to the axis of armature rotation.

Commutators 77 and 79 comprise annular arrays of segments having radially disposed body portions 85 and axially disposed leg portions 86. The inner ends of portions 85 rest against the plane surfaces of the armature ring portion and leg portions 86 rest on its peripheral surface. As clearly indicated in FIG. 10, the lengths of leg portions 86a, 86b is such as to leave an annular gap 87 of significant width between them. The segments of commutators 77 and 79 are insulated from one another, and they are bonded to the outer ring portion of the armature by means of a resinous insulating material such as an epoxy resin. This bonding medium may be an integral part of the jackets 88a and 88b applied over the armature winding. Prestressed bands 89a, 89b of epoxy resin impregnated glass fibers may be applied over the leg portions 86a, 86b of the segments to help secure them to the armature ring portion 80.

Commutators 76 and 78 also comprise annular arrays of segments which encircle commutators 77 and 79 respectively spaced radially outward therefrom to define an annular space 90 between the four commutators. This space is filled with a body of resinous insulating material such as an epoxy resin which bonds to the segments of all four commutators and may be reinforced with glass fibers. A prestressed band 91 of epoxy resin impregnated glass fibers applied around the leg portions 92 of the segments of commutators 76 and 78 completes the multiplex commutator structure. It will be noted from FIG. 10 that the annular gap 87 between commutators 77 and 79 provides a space for bringing leads 93 from the armature winding to the segments of commutators 76 and 78.

In the manufacture of a multiplex commutator such as that shown in FIG. 10, commutators 77 and 79 may be bonded to the outer ring portion 80 of the armature during encapsulation of the armature winding, this being done through the use of a suitable fixture for holding the winding conductors and commutator segments in place during application of the resin and curing thereof. The next step will then be the application of the prestressed bands 89, if such bands are used. It is also possible to first complete encapsulation of the armature winding and then attach the commutators to it. The segments may be connected to the appropriate winding leads either before or after bonding the commutators to the winding structure, depending on the manufacturing technique employed.

The final step in the assembly operations is mounting commutators 76 and 78 on commutators 77 and 79. This is done by holding the segments in a fixture while filling space 90 with the resin and curing it. Then the resin impregnated filaments of bank 91 are applied under tension and the resin cured. In this step, the segments are connected to the appropriate winding leads before the resin is applied in space 90, the leads being brought out from the winding through gap 87.

It is also possible to assemble all four commutators to the winding ring portion in one moulding operation. In this case, bands 89a and 89b will not be used; the spaces they occupy will be filled with resin. As before, band 91 will be applied after the resin has been cured, and it will be applied under tension so as to stress the commutator structure in compression.

Although four ccommutators on a single disc armature may well be the practical limit, it is possible to increase this number, for example, six commutators.

Figure 11:
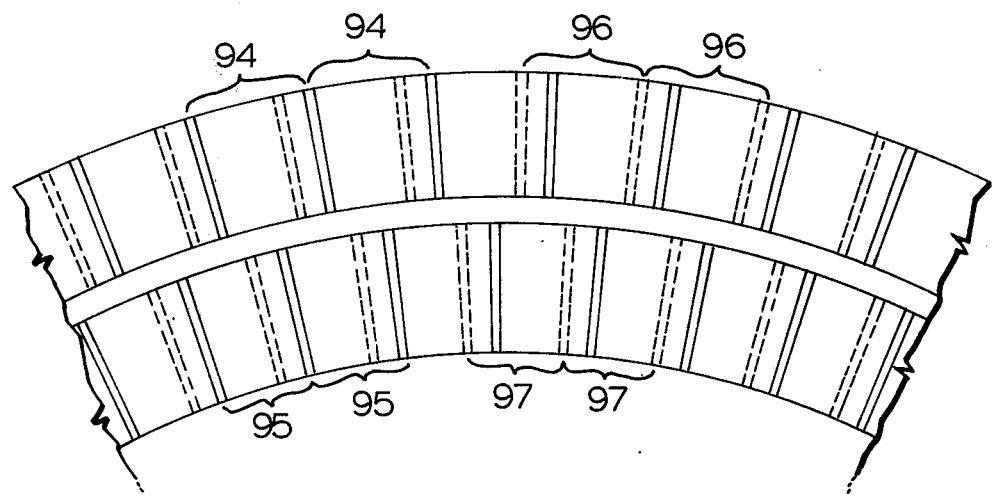

With multiplex commutators, it will be operationally desirable to have the total commutating function distributed around the disc so that each unit coil occupies in space its own portion of the disc periphery. The many unit coils will be uniformly distributed around the disc. This is accomplished by suitably locating the segments of each of the several commutators with respect to the segments of the other commutators. One suitable arrangement of four commutators is shown in FIG. 11. In this Figure, numerals 94 and 95 denote the segments of commutators 76 and 77 respectively, and numerals 96 and 97 denote the segments of commutators 78 and 79 respectively. This arrangement has the segments of the four commutators displaced angularly by one quarter segment pitch as illustrated. In this arrangement, all four brushes of each set will be in radial alignment.

An alternative to the segment arrangement shown in FIG. 11 will be to have all four commutators with segments in radial alignment, and then have the brushes at each commutator displaced angularly by one quarter segment pitch with respect to the brushes on other commutators.

What I claim as new and desire to secure by Letters Patent of the United States is:

1. A discoidal armature for a dynamoelectric machine comprising a plurality of coils disposed in an overlapping, flat, circular array and bonded together with a strong, adherent, nonconductive bonding medium to provide a rigid discoidal structure including a disc portion integral with and coaxial with respect to inner and outer ring portions respectively; commutating means for said structure characterized by at least one ring of commutator segments on said outer ring portion, at the radial periphery thereof, coaxial therewith and connected to said coils; and means for securing said segments to said outer ring portion.

2. The discodial armature of claim 1 wherein said segment securing means comprises means for bonding said segments to said outer ring portion; and prestressed bonding means on the periphery of said commutator for reinforcing said bonding means in securing said commutator segments to said outer ring portion of the armature.

3. This discoidal armature of claim 2 wherein said commutating means is a simplex commutator.

4. The discoidal armature of claim 2 wherein said commutating means is a duplex commutator.

5. The discoidal armature of claim 2 characterized by having said commutating means comprising a ring of elongated commutator segments located side-by-side on the periphery of said outer ring portion with the axes of the segments parallel to the axis of said discoidal structure; an adherent, non-conductive bonding medium bonding said segments to said outer ring portion; and a pair of axially spaced, pre-stressed, non-conductive bands around said ring of segments, said commutator having a cylindrical working face between said bands.

6. The discoidal armature of claim 2 characterized by having said commutating means comprising a ring of U-shaped commutator segments located astride said outer ring portion with the bases of the U's at the peripheral surface thereof and the legs of the U's disposed radially with respect to said axis, said bases of the U-shaped segments defining a peripheral commutator surface and said legs of the U-shaped segments defining two oppositely disposed working commutator faces; an adherent non-conductive, bonding medium bonding said segments to said outer ring portion; and pre-stressed, non-conductive banding means around said peripheral commutator surface.

7. The commutator of claim 6 further characterized by an annular separation in the bases of said ring of U-shaped segments dividing it into two axially rings of L-shaped segments which provide two separate commutators; and an insulating medium in the space dividing the segments insulating one commutator from the other commutator.

8. The discoidal armature of claim 2 characterized by said commutating means being a duplex commutator comprising two rings of commutator segments disposed back-to-back in axially spaced relation around the periphery of said armature outer ring portion coaxial therewith; insulating means interlocking the respective back-to-back segments; an adherent resinous material encapsulating said interlocking means and bonding to said segments and said armature outer ring portion; pre-stressed, non-conductive banding means around said resinous encapsulating material; and a working face on each commutator.

9. A discodial armature for a dynamoelectric machine comprising a plurality of coils disposed in an overlapping, flat, circular array and bonded together with a strong, adherent, non-conductive bonding medium to provide a rigid discoidal structure including a disc portion integral with and coaxial with respect to inner and outer ring portions respectively; commutating means for said structure characterized by a plurality of pairs of commutators disposed concentrically around said outer ring portion, at the radial periphery thereof, coaxial with respect to the axis of armature rotation; each said pair of commutators having two rings of segments disposed back-toback in axially spaced relation and presenting oppositely disposed plane working faces; a resinous bonding medium bonding said segments to said outer ring portion; and prestressed bonding means cooperating with said bonding medium for securing said segments in place.

10. The discoidal armature of claim 9 further characterized by two pairs of commutators, one pair being concentric with respect to the outer pair.

11. The discoidal armature of claim 10 wherein said first pair of commutators have segments with body portions disposed radially along said outer ring portion and leg portions disposed axially on the peripheral surface of said outer ring portion, said second pair of commutators have like segments in like arrangements located radially outward from said first pair of commutators, an epoxy resin filling the space between the commutators and ring portion and bonded thereto, and a prestressed band of resin bonded glass fibers surrounding said leg portions of the segments of said pair of second commutators.

12. The discoidal armture of claim 11 wherein a prestressed band of resin bonded glass fibers surrounds said leg portions of the segments of each one of said first pair of commutators.

* * * * *